United States Patent [19]

Barlai et al.

[11] Patent Number: 4,931,736
[45] Date of Patent: Jun. 5, 1990

[54] METHOD OF AND APPARATUS FOR MICROELECTRIC MEASURING OF INHOMOGENEITIES ON THE WALLS OF BOREHOLES FOR USE IN WELL LOGGING

[75] Inventors: Zoltán Barlai, Budapest; Géza Dorcsi, Szolnok; Ferenc Réz, Budapest; Attila Vamos, Budakalász, all of Hungary

[73] Assignees: Magyar Allami Eotvos Lorand Geofizikai Intezet; Koolajkutato Vallat, Hungary; a part interest

[21] Appl. No.: 174,077

[22] Filed: Mar. 28, 1988

[30] Foreign Application Priority Data

Apr. 13, 1987 [HU] Hungary ................. 1630/87

[51] Int. Cl.$^5$ .............................. G01V 3/20
[52] U.S. Cl. .................... 324/367; 324/354; 324/366
[58] Field of Search ............... 324/354, 355, 357, 360, 324/366, 367, 373–375, 369–371; 73/151, 152

[56] References Cited

U.S. PATENT DOCUMENTS

| | | | |
|---|---|---|---|
| 2,669,690 | 2/1954 | Doll | 324/367 |
| 2,712,629 | 7/1955 | Doll | 324/374 |
| 2,750,557 | 6/1956 | Bricaud | 324/374 X |
| 2,813,248 | 11/1957 | Ferre | 324/374 |
| 4,567,759 | 2/1986 | Ekstrom et al. | 324/355 X |

FOREIGN PATENT DOCUMENTS

152234 1/1966 Hungary ................. 324/366
441453 12/1974 U.S.S.R. ................. 324/374

Primary Examiner—Gerard R. Strecker
Assistant Examiner—Warren S. Edmonds
Attorney, Agent, or Firm—Handal & Morofsky

[57] ABSTRACT

The method of measuring local rock inhomogeneities on the wall of a borehole is disclosed. The method of measurement includes the step of generating microelectric fields in a conductive way on an area of the wall of the borehole insulated from the drilling mud by an insulating pad which carries electrodes and excludes direct electrical contact between the electrodes and the conductive borehole liquid. The local current intentities are measured at, at least two, different places perpendicularly to the wall of the borehole and the measured current intensities are compared to each other. Alternatively, a local voltage difference created by current flowing first parallel to the wall of the borehole and then an absolute voltage created by the same current in another section of flow where the current is perpendicular to the wall of the borehole may be measured and the measured voltages compared to each other. The field generating step and the measuring step are repeated continuously versus borehole axis, and the local rock inhomogeneities are determined from the magnitudes of the ratios produced by the comparisons made. The apparatus comprises electrodes arranged in insulating pads lowered into the borehole and supported therein, connected by a cable with surface units.

31 Claims, 5 Drawing Sheets

METHOD OF AND APPARATUS FOR MICROELECTRIC MEASURING OF INHOMOGENEITIES ON THE WALLS OF BOREHOLES FOR USE IN WELL LOGGING

BACKGROUND OF THE INVENTION

The invention relates to a method of and an apparatus for measuring inhomogeneities on the wall of boreholes in formations pierced by a borehole, especially for carrying out investigations in fractured and vuggy hydrocarbonbearing and waterbearing rocky reservoirs particularly containing thin rock laminations and, besides, in thinly laminated oil/gas and water reservoirs, and, in thinly laminated stone coal, brown coal, lignite, ore layers by investigating and determining the inhomogeneities on the wall of a borehole.

In the hydrocarbon- and waterbearing rocks the reservoir capacity and permeability are substantially increased by fractures (fissures) and vugs especially in carbonates, in metamorphic and igneous rocks; on the other hand the thin interbedded laminae may obscure the detection of useful minerals by logging methods both in fluid-reservoirs and in coal or ore layers. Hence, the detection of those two objects is of paramount importance in exploring the useful minerals by well logging.

For elucidating the inhomogeneities of the rocks core-drilling is applied, however, the fractures and vugs are partly lost during core-drilling since the cores are broken just at these places; on the other hand delineation of the thin laminae can not be well defined by laboratory investigation and measurement of the cores of small sizes, i.e. the same disadvantages should be taken into account in comparison with the in situ investigations in the boreholes as in other methods of determination of rock physical parameters.

Detection of rock inhomogeneities on the wall of the borehole has not yet been adequately solved in the well logging methods. This was the subject of a Hungarian patent issued in 1966 under the Patent No. 152 234, and of the U.S. Pat. No. 4,567,759 granted in 1986. All these referenced patents propose the measurement of the variations of the electrical conductivity of the rocks by pad-type microsondes and they exhibit a common drawback resulting a serious shortage in the task solution, namely they can not distinguish the effects of the fractures and vugs and thin rock laminae from other kinds of effects which also influences the electrical conductivities of the rocks, thus e.g. from variations of porosity and the dispersed clay content of the rock matrix.

SUMMARY OF THE INVENTION

The present patent application is directed to the elimination of the above mentioned shortcomings by elaborating and applying a new method and apparatus which ensures the direct detection of the sharp local inhomogeneities on the wall of the borehole while being mostly independent of the different disturbing effects.

The invention is based on the recognition namely that the inhomogeneities sought locally distort a specially generated microelectrical field thus the presence of inhomogeneity and its geometric pattern can be determined from the extent of the distortion of the electrical field.

Accordingly the idea of this patent application is the generation of special microelectrical fields in the wall of the borehole, wherein the wall is electrically shaded from the drilling mud and the microelectrical fields undergo substantial distortion caused by local inhomogeneities of the rocks in the wall of the borehole, while the distortions are independent of other effects, e.g. of the rock conductivity showing variation from layer to layer. By the shading of the microelectrical field the direct electrical contact between the electrodes, located on the insulating pad, and the conductive borehole liquid is excluded. The area of the borehole wall covered by the pad is insulated from the drilling mud.

The idea of this patent application lies in sharp differential detection of electrical field distortions caused by local rock inhomogeneities on the wall of the borehole; the differential detection is performed by comparing the magnitudes of the local electric current intensity to the current intensity relating to a greater borehole surface surrounding the local inhomogeneity. The local electric current intensity is substantially distorted by the local rock inhomogeneities while the last without substantial local inhomogeneities is not distorted; the differential detection is realised by ratio production of the measured current intensities. The magnitude of the measured ratios specifically characterizes the local rock inhomogeneities thus revealing their occurence and geometrical pattern in the background of the greater wall surface.

The generation of the microelectrical field and the measurement is repeatedly carried out at different depth points or executed quasi-continously versus a depth axis of the borehole while the circumference of the borehole is scanned by the generation and the measurement of the field at the investigated depth points. Thus the inhomogeneities are detected at many places of the borehole circumference which provides a full image of the inhomogeneities characterizing the investigated depth region.

In realizing the idea of the present application a microelectrical field electrically shaded from the drilling mud is generated in the wall of the borehole by means of conductive currents and the local density of the current transport is measured at least at two different nearby places and the local transport densities are compared with each other in form of a quotient.

In the first main embodiment of the proposed method parallel current intensities in a current field generated perpendicularly to the wall of the borehole are measured and compared with each other in form of a quotient. In this embodiment the current intensity in the numerator of the quotient is substantially altered (distorted) by the local rock inhomogeneities, while the current intensity in the denominator of the quotient is not, or is only in a negligible extent distorted by the same inhomogeneities, thus the occurence of the inhomogeneity is substantially determined by alteration of the quotient being the comparative measure of the inhomogeneities. At the same time, in this first main embodiment the value of the quotient is not sensitive to alterations of the matrix porosity and the disseminated clay content and to other similar parameters of the rock, since the numerator and the denominator of the quotient are modified in the same direction at nearly equal relative extent by alterations of these rock parameters, resulting in a substantially negligible change of the quotient.

When realizing the first main embodiment it is advantageous to select the two parallel current intensities to be compared for the electric field generated in normal direction to the wall of the borehole in a manner that one of them is associated to a small local surface area on the wall of the borehole and the other one is related to a major surface area surrounding the first small local area, however, neglecting it from the measurement. This procedure is repeated with a number of small areas composing the major surface area covering thereby the whole surface.

In a proposed variant of the first main embodiment the particular small local surface area exhibiting the maximum value of the quotient is looked for, thus revealing the small surface area characterized by the maximum local inhomogeneity on the investigated major surface area of the borehole.

In another preferred variant of the first main embodiment the local current transport intensity, along diagonals crossing the center of the investigated major surface area measured and compared with the current transport intensity of the major surface area. This procedure is repeated by varying the angular position of the diagonals preferably at 12 different positions and the angular position exhibiting the maximum quotient of the current transport intensity is determined on the wall of the borehole. This variant is especially efficient for determining rock inhomogeneities with straight line patterns, e.g. thin interlaminations, fractures by indicating their existence and direction on the wall of the borehole.

With the other method an electric field is generated by means of ring-shaped conductive current electrodes on the shaded borehole wall isolated electrically from the drilling mud by a pad; at the beginning in this field the current moves first from the ring-shaped electrode towards the center of the ring parallel to the wall of the borehole, then when approaching to the center the current lines turn to be perpendicular to the wall of the borehole wherein these two current line sections are connected in series with each other. With this method first a voltage difference within the ring-shaped current generating electrode created by the current parallel to the wall of the borehole is measured, then an absolute voltage in the center of the ring electrode created by the current perpendicular to the wall of the borehole is measured and the quotient of these two voltages is produced. Since the current intensity parallel to the borehole wall thus also the measured voltage difference is more sensitively affected by the local rock inhomogeneities than the perpendicular current intensity and the measured absolute voltage, the quotient sharply indicates the local inhomogeneities located inside the current-generating ring electrode element. On the contrary, variations of rock porosity, disseminated clay content and other disturbing rock properties cannot significantly alter the magnitude of the quotient, because they modify the two compared measured voltages in the same direction at a similar relative extent. However, the direction of the rock inhomogeneities exhibiting a straight-line pattern is not indicated by this main embodiment of the proposed method, while their existance and place on the wall of the borehole is as sharply indicated as by the first main embodiment.

It is advantageous to bring about the current field generations and to carry out the measurements at many places around the circumference of the borehole with both main embodiments of the invented method, preferably along six lines, thus providing a full image of the wall of the borehole by merging the quotients and the directions associated to the inhomogeneities into a continuous picture.

It is advantageous to realize the two main embodiments of the method with different frequencies of the field generation, possibly in a multiple frequency or multiplex manner, with the purpose of eliminating some disturbing effects. Moreover, it is advantageous, for eliminating certain noises and other disturbing effects to vary the relative positions of and distances between the current generation and the measurement. Besides, it is preferred to generate the electric field, and, to measure the current intensities and the voltages at a number of places on the wall of the borehole, simultaneously. It is advantageous also to vary the places of the field generation and the measurements along the borehole axis and on the wall of the borehole and to carry out the measurements in a time—and place-multiplexed way.

Realization of the first main embodiment of the proposed method is performed according to the invention by an apparatus containing surface equipment including a current inducing generator for creating an electric field, a central control, arithmetic evaluating, graphic-photographic display unit and measuring units for determining the local inhomogeneities, and recorders for recording logs and images of the local inhomogeneities, a well logging cable connecting the surface equipment to a downhole tool, a downhole tool lowered in the borehole filled with drilling mud, the tool including current electrodes connected to the current inducing generator for feeding conductive electrical currents into the rocks, measuring electrodes for measuring current intensities connected to an amplifier, signal processing-coding-coupling multiplexer unit for creating the quotients and place and direction coordinates from the measured current intensities and transmitting them through the cable to the surface equipment. The current feeding electrodes are arranged on insulating pads supported on the wall of the borehole by spring-activated arms, they are shaded by the pads from the drilling mud, thus the current electrodes have no direct electrical contact to the drilling mud, the current electrodes generating current intensities perpendicularly to the wall of the borehole wherein the parallel current intensities are measured by the measuring electrodes also arranged on insulating pads.

Realization of the second main embodiment of the proposed method is performed according to the invention by an apparatus containing surface equipment including a current inducing generator for creating an electric field, measuring units for determining the local inhomogeneities and recorders for recording logs and images of the local inhomogeneities, a well logging cable connecting the surface equipment to a downhole tool, a downhole tool lowered in the drilling mud in the borehole including ring-shaped current electrodes connected to the current inducing generator for feeding electrical currents into the rocks, measuring electrodes within the ring-shaped current electrodes for measuring voltage difference and absolute voltage connected to amplifier-signal processing-coupling units creating quotients from the measured voltage difference and the absolute voltage, and transmitting the quotients through the cable to the surface equipment, wherein the ring-shaped current electrodes are arranged on insulating pads supported on the wall of the borehole by spring-activated arms, they are shaded thereby from the drilling mud, the current generating electrodes being capable of generating currents which flow first parallel to the wall of the borehole then connected to the parallel current lines in series, they flow perpendicularly to the wall wherein a voltage difference created by the parallel current lines is measured between a ring-shaped and a central point-shaped measure electrode, both arranged inside the ring-shaped current electrodes, and an absolute voltage created by the perpendicular current lines is measured on the central measure electrode related to a spatially remote located reference electrode.

For reducing both noise sensitivity of the apparatus, especially when measurements at different frequencies are simultaneously carried out, it is advantageous to apply frequency—and phase-selective means for amplifying, signal processing—coupling, and to ensure simultaneously the frequency—and phase selectivity of the microprocessor means for coupling, signal processing, signal coding and multiplexing.

The conductive current generating and the measuring electrodes are preferably made of metal.

The current generating and the measuring electrodes are preferably mounted on more (two-eight) of insulating pads equally distributed in the borehole along its circumference. The number of the insulating pads amounts advantageously from two to eight.

Both apparatus are advantageously combined with other kinds of well known logging apparatus.

The object of the invention is achieved by the method and apparatus shown in the application, namely they provide the detection of sharp local inhomogeneities exhibited on the wall of the borehole, the determination of the geometric pattern of the inhomogeneities, the determination of the direction of inhomogeneities exhibiting straight-line pattern (e.g. fractures, thin interbedded laminae) on the wall of the borehole, by yielding a full image of the said inhomogeneities on the wall along the circumference of the borehole in the investigated depth interval, unaffected by disturbing noises, for example by alterations of the porosity and the disseminated clay content of the rock matrix.

An unexpected advantage of the invention is the determination of the apparent microresistivity of the rocks, simultaneously with the determination of the local rock inhomogeneities, thus yielding a continuous picture about the geological noises, which have been eliminated from the determination of the local rock inhomogeneities by means of the invention.

DESCRIPTION OF THE DRAWINGS

The invention is presented by some embodiments shown by way of example with reference to the accompanying drawings. In the drawings

DETAILED DESCRIPTION OF THE INVENTION

Figure 1:
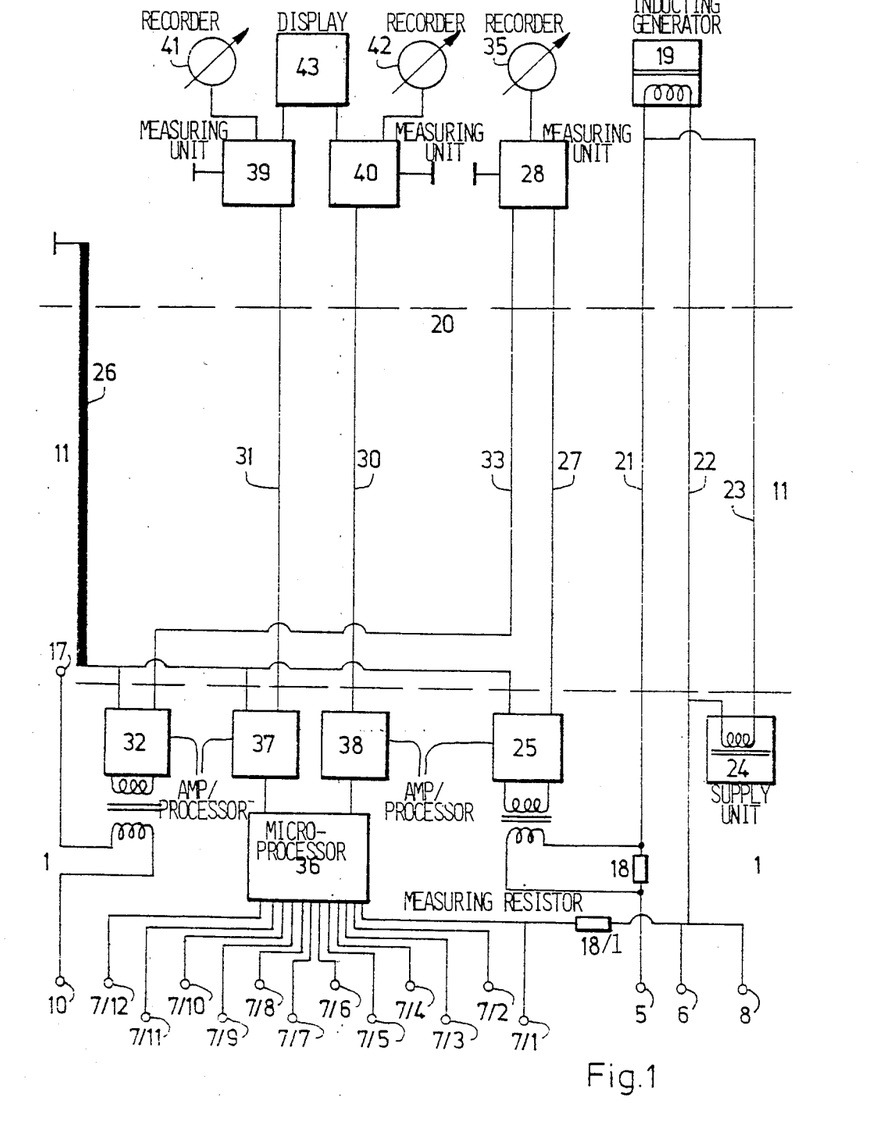
FIG. 1 shows a block diagram of a proposed apparatus for realizing the first main embodiment of the method according to the invention.

With reference to FIG. 1, in a borehole 11 an investigation tool 1 is shown having current generating electrodes 5, 6, 8 arranged for conductive generation of an electric field which are connected to a current inducing generator 19 across a current measuring resistor 18 through cable cores 21, 22. Supply unit 24 for energizing the investigation tool 1 is connected to the current inducing generator 19 through cable cores 22, 23. The current measuring resistor 18 is coupled across means 25 for amplifying, signal processing and coupling to a measuring unit 28 through a cable core 27 of a well logging cable 20 and its cable steel armor 26. The investigation tool 1 is equipped with conductive measuring electrodes 10 and 17 for determining the voltage of electrode 10 related to a far reference electrode 17; electrodes 10 and 17 are connected across means 32 for amplifying, signal processing and coupling to the measuring unit 28 through a cable core 33 and the cable steel armour 26. The output of the measuring unit 28 is connected to a recorder 35. The investigation tool 1 comprises further conductive measuring electrodes 7/1, 7/2, 7/3, 7/4, 7/5, 7/6, 7/7, 7/8, 7/9, 7/10, 7/11, 7/12 for determining current intensities; they are connected to input terminals of a microprocessor means 36 for coupling, signal processing, signal coding and multiplexing, then the output terminals of means 36 are connected to input terminals of means 37, 38 for amplifying, signal processing and coupling units 37, 38; the output terminals of the means 37, 38 are connected to input terminals of measuring units 39, 40 through cable cores 30, 31 and the cable steel armor 26; the outputs of the measuring units 39, 40 are connected to a central control, arithmetic, graphic/photographic display unit 43 and the latter to recorders 41, 42.

Figure 2:
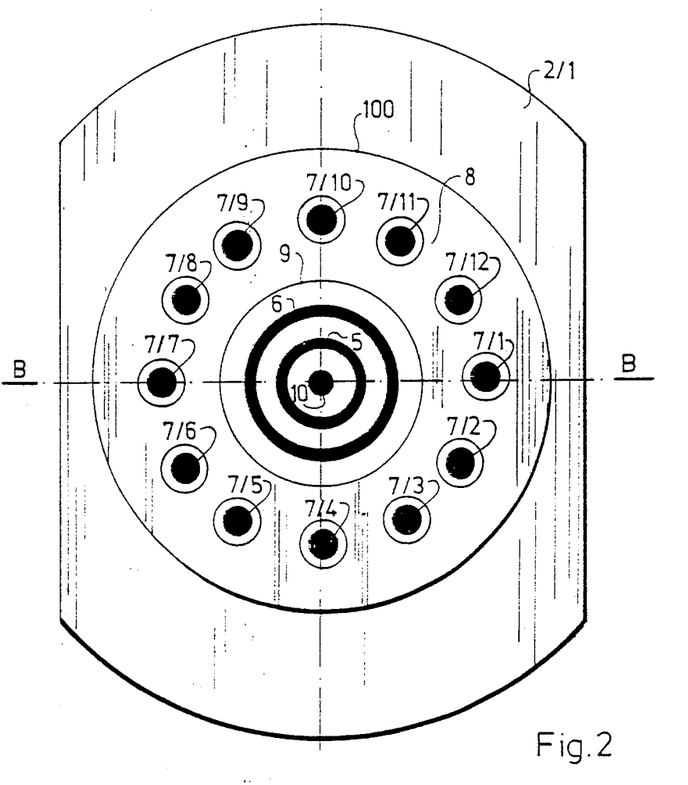
FIG. 2 shows the side view of an investigation tool pad having current generating and measuring electrodes arranged for realizing the first main embodiment of the proposed method.
Figure 3:
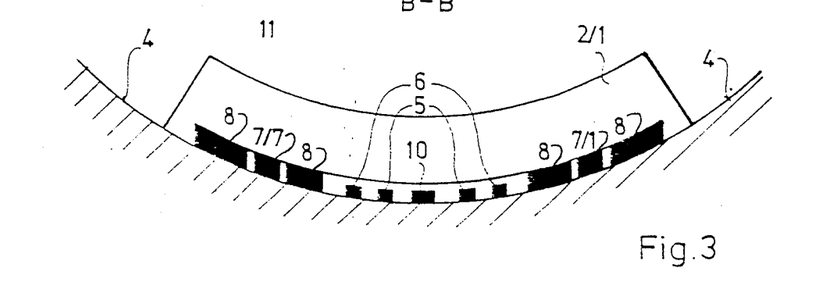
FIG. 3 shows the cross-sectional view in a plane B—B of the investigation tool pad of FIG. 2.

In FIGS. 2 and 3 an insulating pad 2/1 of the investigation tool 1 associated to the apparatus of FIG. 1 is shown in the borehole 11 having a wall portion 4 with the arrangement of the conductive current generating and measuring electrodes 5, 6, 7/1 to 7/12, 8. In the center of the insulating pad 2/1 the voltage measuring electrode 10 forming a small circular element is located. The electrode 10 is surrounded, according to coaxial circular patterns, by ring shaped current generating electrodes 5, 6 and the current generating electrode 8 exhibiting a large surface area with an inner circular edge 9 and an outer circular edge 100. Twelve point-like small current measuring electrodes 7/1 to 7/12 are located in small circular holes cut out from the current generating electrode 8, the mentioned twelve electrodes 7/1 to 7/12 exhibiting electrical contact with the rock through the drilling mud across a small surface area. The central points of the measuring electrodes 7/1 to 7/12 are equally distributed along a circle surrounding the central point of the measuring electrode 10. The mentioned electrodes 10, 5, 6, 8, 7/1 to 7/12 are made of metal and they are electrically isolated from each other by isolating material of the insulating pad 2/1.

Figure 4:
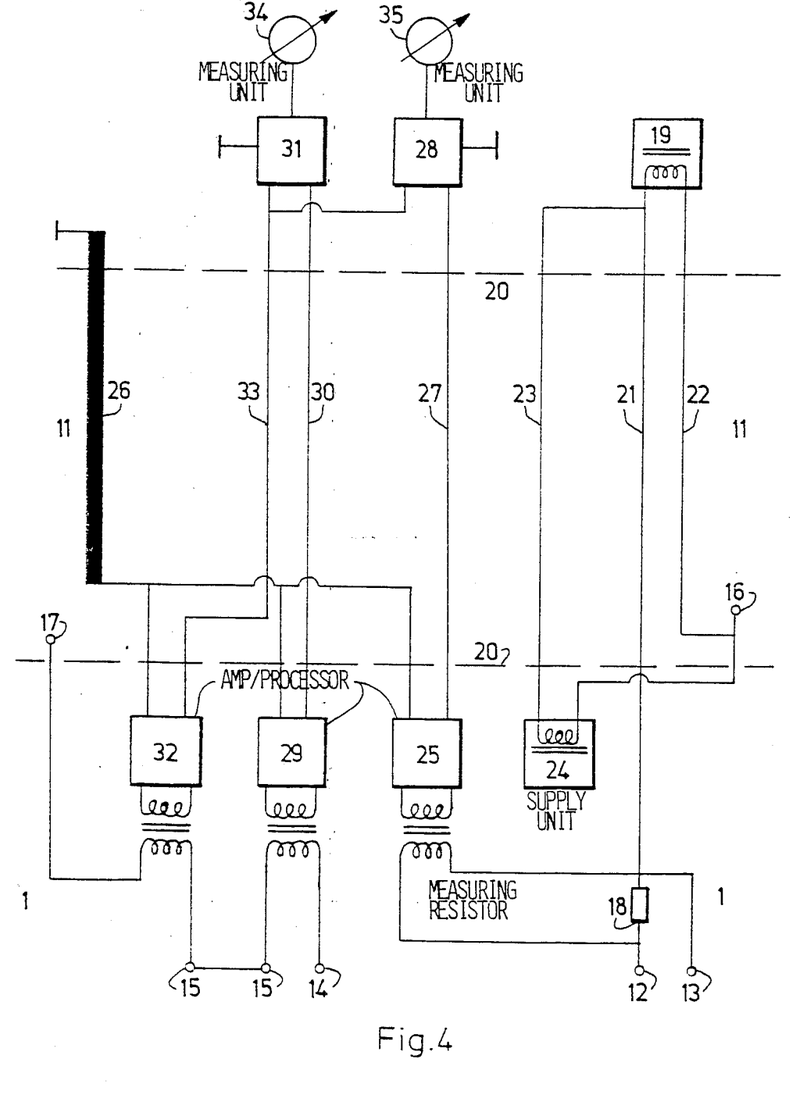
FIG. 4 shows a block diagram of a proposed apparatus capable of realizing the second main embodiment of the method according to the invention.

With reference to FIG. 4, in a borehole 11 an investigation tool 1 is shown having conductive current generating electrodes 12, 13 which are short-circuited and a current return electrode 16; they are connected to a current inducing generator 19 across a current measuring resistor 18 through cable cores 21, 22. The energy supply unit 24 for energizing the investigation tool 1 is connected to the current inducing generator 19 through cable cores 22, 23. The current measuring resistor 18 is coupled to a measuring unit 28 across means 25 for amplifying, signal processing and coupling unit through a cable core 27 of a well logging cable 20 and its cable steel armor 26. The investigation tool 1 is equipped with conductive measuring electrodes 14, 15 and a far voltage reference electrode 17 for determining voltages, the last two connected to the measuring unit 28 across means 32 for amplifying, signal processing and coupling through a cable core 33 and the cable steel armour 26. The output of the measuring unit 28 is connected to a recorder 35. The conductive measuring electrodes 14, 15 of the investigation tool 1 are connected to the input of means 29 of amplifying, signal processing and coupling; the outputs of the means 29 are connected to a measuring unit 31 through a cable core 30 and the cable steel armor 26; to the input of the measuring unit 31 are also connected the conductive measuring electrodes 15, 17 across means 32 for amplifying, signal processing and coupling through a cable core 33 and the cable steel armor 26. The output of the measuring unit 31 is connected to a recorder 34.

Figure 5:
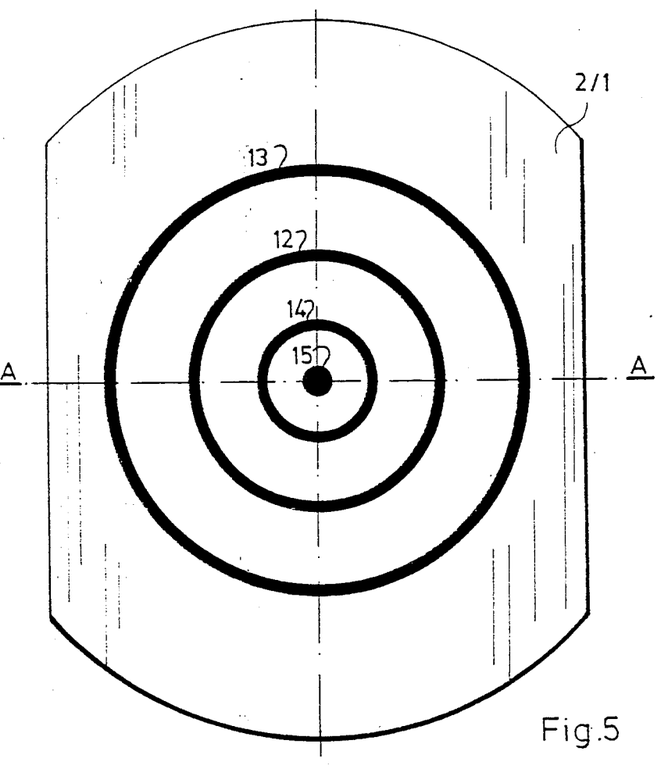
FIG. 5 shows the side view of a tool pad having current generating and measuring electrodes arranged for realizing the second main embodiment of the proposed method.
Figure 6:
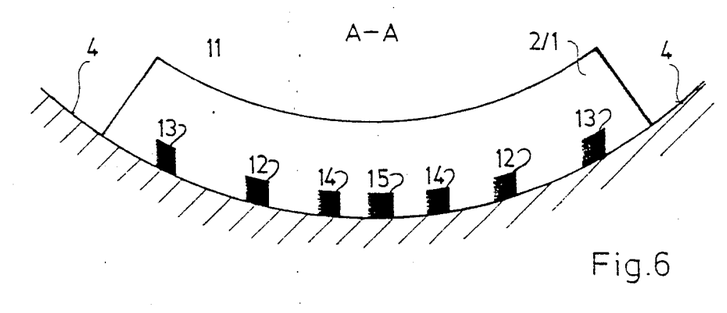
FIG. 6 shows the cross-sectional view in a plane A—A of the investigation tool pad of FIG. 5.

In FIGS. 5 and 6 the insulating pad 2/1 of the investigation tool 1, associated to the apparatus of FIG. 4 is shown with the arrangement of the conductive current generating electrodes 12, 13 and the voltage measuring electrodes 14 and 15. In the center of the pad 2/1 a point-like measuring electrode 15 for measuring voltage is located. The electrode 15 is coaxially surrounded by current feeding ring-shaped electrodes 12, 13 and a ring-shaped measuring electrode 14. The mentioned electrodes 12, 13, 14, 15 are electrically isolated from each other by insulating material of the pad 2/1.

Figure 7:
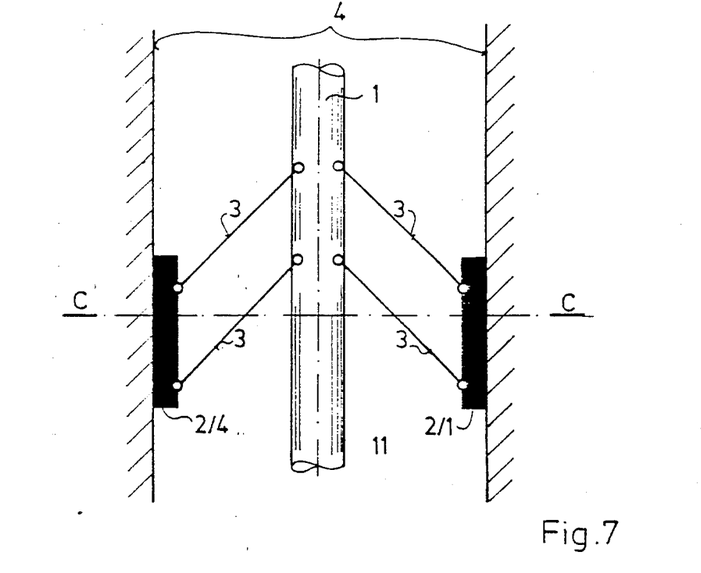
FIG. 7 shows the schematic side view of the investigation tool installed with six pads.
Figure 8:
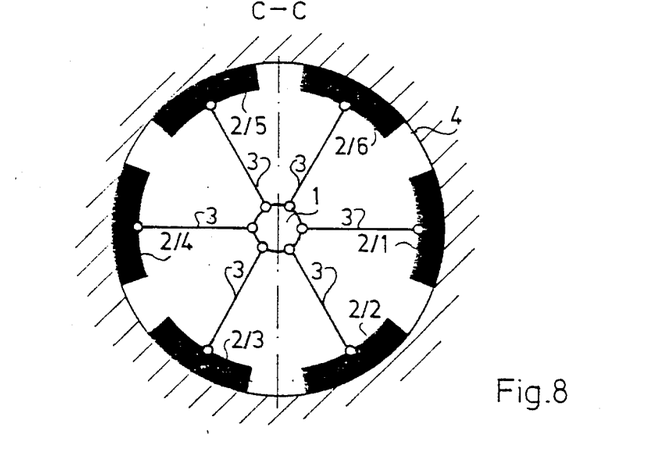
FIG. 8 shows the schematic cross-sectional view in a plane C—C of the investigation tool realized according to FIG. 7.

According to FIGS. 7 and 8 the investigation tool 1 is installed by means of spring-activated arms 3 with an arrangement of pads 2/1, 2/2, 2/3, 2/4, 2/5 and 2/6 suspended in the borehole 11. The arrangement is shown in the case of a six-arm investigation tool 1. The pads 2/1 to 2/6 made of insulating material and mounted with current generating and measuring electrodes are supported on the wall 4 of the borehole 11. The electrodes 5, 6, 7/1 to 7/12, 8, 10 and 12, 13, 14, 15 are arranged on the pads 2/1 to 2/6 according to FIGS. 2, 3, 5 and 6.

The function of the novel apparatuses presented in FIGS. 1 to 8 and the performance of the method proposed according to the invention are explained as follows:

In the embodiment of the invention presented in FIG'S 1 to 3 a conductive exciting current is fed from the inducing generator 19 across the current generating electrode 5 of the investigation tool 1 into the rocks which are shaded from the drilling mud by the insulating pad 2/1; a smaller part of this current returns to the ring-shaped current generating electrode 6 along a path which in little depth of the rocks is parallel to the wall 4 of the borehole 11 and this smaller part makes the greater part of the current flow more deeply into the rock; this greater part of the current returns to the metallic current generating electrode 8 exhibiting a large surface area and to the conductive current measuring electrodes 7/1, 7/2, 7/3, 7/4, 7/5, 7/6, 7/7, 7/8, 7/9, 7/10, 7/11 and 7/12 characterized by small surface areas perpendicularly to the wall 4 of the borehole 11. The small current intensities $I_{7/i}$ (i means an integer from 1 to 12) characterizing the currents flowing back to the conductive current measuring electrodes 7/1 to 7/12 are detected by means of the current measuring resistors 18/1 etc.; these small current signals are introduced to microprocessor means 36 for coupling, signal processing, signal coding and multiplexing. (For the sake of simplicity in FIG. 1 only a single measuring resistor 18/1 connected to the measuring electrode 7/1 is shown.)

According to the idea of the invention the microprocessor means unit 36 performs arithmetic operations on the current intensities $I_{7/1}$ to $I_{7/12}$; in this course quotients $M_i$ are produced according to the general algorithm as below:

$$M_i = \frac{I_{7/i}}{\left(\sum_{i=1}^{12} I_{7/i}\right) - I_{7/i}}$$

From the quotients determined the maximal one, $(M_i)_{max}$ is selected as being characteristic for the maximum local rock inhomogeneity on the surface area of the wall covered by the current generating electrode 8. If the surface area is homogeneous, then the quotients $M_i$ are constant and equal to $1/11 = 0.091$ which represents the basic magnitude of the quotient.

The quotient $M_i$ is not affected by variations of the matrix-porosity, the disseminated clay content and other parameters of the rock varying from layer to layer.

The idea of the invention covers also a special investigation of rock inhomogeneities which exhibit straight-line patterns (e.g. thin laminae, fractures) along diagonals crossing the center of the voltage measuring detector 10; this special investigation is performed by the microprocessor means 36 according to the general algorithm as follows:

$$M_{i+6} = \frac{I_{7/i} + I_{7/(i+6)}}{\left(\sum_{i=1}^{12} I_{7/i}\right) - (I_{7/i} + I_{7/(i+6)})}$$

From the quotients determined the maximal one, $(M_{i+6})_{max}$ is selected, and the angular direction of the diagonal crossing the corresponding electrodes with the subscripts $i_{max}$ and $i_{max}+6$ determine the direction of the straight lined inhomogeneity on the wall of the borehole.

The magnitudes of the quotients $M_i$, $(M_i)_{max}$, $M_{i+6}$, $(M_{i+6})_{max}$, further on the coordinates of places and angular directions corresponding to the electrodes arranged at the places with the subscripts i, $i_{max}$ and $i_{max+6}$ are transmitted to the surface equipment by the microprocessor means 36 in the known manner of operating the informatic systems in form of coded signals; in the surface equipment the image of the local inhomogeneities will be created from the quotients and the coordinates of places and directions by the central control arithmetic, graphic/photographic display unit 43. Simultaneously the apparent microresistivity of the rock is produced by the measuring unit 28 arranged on the surface from the current intensity fed across the current electrode 5 and from the voltage of the measuring electrode 10; the current signal is transmitted from the measuring resistor 18 across the means 25 for amplifying, signal processing and coupling unit 25, and the voltage signal is transmitted via the means 32 for amplifying, signal processing and coupling unit 32 to the measuring unit 28.

In the other example of the invention presented by FIG'S. 4, 5 and 6 a conductive exciting current is fed from the inducing generator 19 across the short-circuited current generating electrodes 12, 13 into the rocks which are shaded from the drilling mud by the insulating pad 2/1 of the investigation tool 1; a part of the current flows into the inside of the ring-shaped current electrode 12, towards the center of the electrode 15 for measuring voltage, parallel to the wall 4 of the borehole 11 producing a voltage difference $V_{14\text{-}15}$ between the conductive measuring electrodes 14 and 15. When the current transport approaches the center of the ring-shaped electrodes 12, 13 and 14 the current lines turn to decline perpendicularly to the wall 4 of the borehole 11 and a voltage $V_{15}$ is generated at the centrally arranged electrode 15 for measuring voltage relative to the electrode 17, arranged spatially distant in order to form a voltage reference electrode.

These two said voltage signals are transmitted across the means 29 and 32 for amplifying, signal processing and coupling, respectively, to the surface measuring unit 31 arranged on the surface for creating a quotient M from the two voltages given above according to the general formula $$M = \frac{V_{14\text{-}15}}{V_{15}}$$

The quotient M exhibits a basic magnitude when being determined in homogeneous rocks, which basic quantity is not affected by alterations of the matrix porosity and the disseminated clay content and other parameters of the rock, however, the quotient M shows a sharp increase when the electric field generated enters an area with local rock inhomogeneity being inside of the ring-shaped measuring electrode 14. The recorder 34 will reveal the local rock inhomogeneities on the wall 4 of the borehole 11 by sharp alterations of the quotient M; simultaneously the apparent rock microresistivity is recorded in the known way by the recorder 35 which is activated by the measuring unit 28.

FIGS. 7 and 8 illustrate a possible multiplication of the equipment shown in FIG'S. 1 to 6 by multiplying them on insulating pads (e.g. on six pads 2/1 to 2/6 according to FIG. 8) equally distributed along the wall circumference 4 of the borehole 11, a full image of the rock inhomogeneities is yielded by means of displaying the alterations of the quotients M and the corresponding space and angular position coordinates in the investigated depth interval.

What is claimed is:

1. A method of measuring sharp local rock inhomogeneities on the wall of a borehole in layers pierced by said borehole comprising the steps of:
   (a) generating an electric field by microelectrodes in a conductive way on said a side of wall of a borehole excluded of a drilling mud filling said borehole;
   (b) measuring the local current intensities in at least two different places by measuring current intensities, coupled parallel with each other for current generated perpendicularly to said wall of said borehole, in the rock insulated from the drilling mud;
   (c) comparing said parallel current intensities measured to each other by performing ratios thereof;
   (d) determining required local rock inhomogeneities by detecting maximum magnitudes of said ratios resulting from dimensionless quotients resulted in said comparing step; and
   (e) repeating said field generating and said measuring and said comparing steps continuously versus depth.

2. The method of measuring as set forth in claim 1, further comprising the steps of:
   (a) measuring said current intensity in a small local surface area of said wall of said borehole in a conductive electric field generated perpendicularly to said wall of said borehole which is insulated from said drilling mud;
   (b) comparing said local current intensity in a form of a ratio with said current intensity of a major surface area selected on said wall of said borehole wherein said major surface area surrounds before said small local area exhibiting said small current intensity; and
   (c) extending said measuring and said comparing steps of said small local current intensities to a number of small surface areas composing said major surface area.

3. The method of measuring as set forth in claim 1, further comprising the step of:
   selecting from said small surface areas that exhibiting the maximum value of the ratios compared, thus determining the place of the maximum rock inhomogeneity within said investigated major surface area on said wall of said borehole.

4. The method of measuring as set forth in claim 1, further comprising the steps of:
   (a) measuring said local current intensity along a diagonal exhibiting a straight-line pattern and crossing the center of said investigated major surface area in said electric field which is generated perpendicularly to said wall of said borehole and insulated from said drilling mud;
   (b) comparing local current intensity in a ratio with said current intensity measured in said major surface area containing said diagonal;
   (c) repeating said measuring and comparing steps for at least two diagonals and as many as twelve diagonals which cross the same central point of said investigated major surface area; and
   (d) determining the place and angular direction of diagonals exhibiting the maximum ratio value obtained in said comparing step of said wall of said borehole thus revealing the place and angular direction of the rock inhomogeneities, thin rock interlaminations, and fractures present along straight-line patterns.

5. The method of measuring as set forth in claim 1, characterized by repeating said measuring and comparing step for twelve different diagonals.

6. The method of measuring as set forth in claim 1, further comprising the steps of:
   (a) generating said conductive electrical field by ring-shaped electrodes arranged on said wall of said borehole electrically insulated from said drilling mud;
   (b) measuring a local voltage difference in said generated electric field within said ring-shaped electrodes in a first measurement section lying parallel to said wall of said borehole and an absolute voltage in the center of the ring-shaped electrodes in a second measurement section selected to lie perpendicularly to said wall along current lines wherein said first and second measurement sections are connected in series with one another;

(c) producing ratios of the two said measured voltages; and (d) determining the maxima of said ratios thus revealing the places of the local rock inhomogeneities.

7. The method of measuring as set forth in claim 1, further comprising the steps of:

performing all said steps along at least two mantle lines selected which are to lie equidistantially on the wall circumference of said borehole;

merging and displaying said measurement results, thus revealing the local inhomogeneities in a full image of said wall of said borehole.

8. The method of measuring as set forth in claim 1, characterized by performing all said steps along at most eight mantle lines.

9. The method of measuring as set forth in claim 1, further comprising the step of performing said measuring and comparing steps at different frequency values of the said electric field generated for reducing some disturbing effects and the effect of inhomogeneous bed-layering.

10. The method of measuring as set forth in claim 9, characterized by carrying out all said steps in a frequency multiplexed way.

11. The method of measuring as set forth in claim 1, further comprising the step of:

varying the relative positions between the place of said field generating and said measuring steps for reducing some disturbing effects.

12. The method of measuring as set forth in claim 1, further comprising the step of:

varying the distances between the place of said field generating and said measuring steps for reducing some disturbing effects.

13. The method of measuring as set forth in claim 1, further comprising the step of:

carrying out at least one of said steps for generating and measuring said electric field at a number of places simultaneously.

14. The method of measuring as set forth in claim 1, further comprising the step of:

varying at least one place of carrying out at least one step for generating and measuring said electric field on said wall of said borehole along the depth axis; and performing said measuring steps in a time and place multiplexed way.

15. A method of measuring sharp local rock inhomogeneities on the wall of a borehole in layers pierced by said borehole comprising the steps of:

(a) generating an electric field using ring-shaped microelectrodes in a conductive way on said wall of said borehole insulated from drilling mud filling said borehole by insulating pads which exclude direct electrical contact to the conductive borehole liquid;

(b) measuring local voltage difference and absolute voltage in least two different places by measuring a local voltage difference in said generated electric field within the ring-shaped electrodes along current lines in a first field section lying parallel to said wall of said borehole and an absolute voltage in the center of the ring-shaped electrodes in a second field section selected to lie perpendicularly to said wall along current lines wherein said first and second field sections are connected in series with one another;

(c) comparing said voltage difference and said absolute voltage measured to each other by comparing ratios thereof;

(d) determining the required local rock inhomogeneities from the maximum magnitudes of said ratios resulting from said comparing steps; and (e) repeating said field generating, said measuring and said comparing steps continuously versus depth.

16. The method of measuring as set forth in claim 15, wherein all said steps are performed along at least two mantle lines selected which are to lie equidistantially on the wall circumference of said borehole and merging and displaying said measurement results, thus revealing the local inhomogeneities in a full image of said wall of said borehole.

17. The method of measuring as set forth in claim 15, characterized by performing said measuring steps along at most eight mantle lines.

18. The method of measuring as set forth in claim 15, wherein all said steps are performed at different frequency values of the said electric field generated for reducing some disturbing effects and the effects of inhomogeneous bed-layering.

19. The method of measuring as set forth in claim 18, characterized by carrying out said measuring and comparing steps in a frequency multiplexed way.

20. The method of measuring as set forth in claim 15, further comprising the step of:

varying the relative positions between the place of said field generating and said measuring steps for reducing some disturbing effects.

21. The method of measuring as set forth in claim 15, further comprising the step of:

varying the distances between the place of said field generating and said measuring steps for reducing some disturbing effects.

22. The method of measuring as set forth in claim 15, further comprising the step of:

carrying out at least one of said steps for generating and measuring said electric field at a number of places simultaneously.

23. The method of measuring as set forth in claim 15, further comprising the step of:

varying at least one place of carrying out at least one step for generating and measuring said electric field on said wall of said borehole along the depth axis; and performing said measuring steps in a time and place multiplexed way.

24. An apparatus for generating logs and images by measuring sharp local inhomogeneities a wall of formation pierced by a borehole, comprising:

(a) surface equipment including a current inducing generator for creating an electric field, a central control, arithmetic evaluating, graphic/photographic display unit and measuring units for determining the local inhomogeneities, and recorders for recording logs and images of the local inhomogeneities;

(b) a well logging cable connecting said surface equipment to a downhole tool;

(c) a downhole tool lowered in drilling mud in said borehole including conductive current electrodes connected to said current inducing generator for feeding conductive electrical currents into the rocks, measuring electrodes for measuring current intensities connected to an amplifier, a signal processing-coding-coupling multiplexer unit for creating the ratios and place and direction coordinates from measured current intensities and transmitting them through the cable to the surface equipment, wherein said conductive current electrodes are arranged on insulating pads supported on said wall of said borehole by spring-activated arms, whereby they are insulated from said drilling mud, said conductive current feeding the electrodes being capable of feeding current intensities perpendicularly to the wall of said borehole and wherein said parallel current intensities are measured by said measuring electrodes.

25. The apparatus as set forth in claim 24, wherein amplifying, signal processing, coupling units and microprocessor means for frequency- and phase-selective coupling, signal processing, signal coding and mupltiplexing for reducing the noise-sensitivity and for measuring simultaneously the different field-generating frequencies is included.

26. The apparatus as set forth in claim 24, wherein said conductive current generating electrodes, and said conductive measuring electrodes are made of metal.

27. The apparatus as set forth in claim 24, characterized by comprising at least two and at most eight insulating pads containing current generating and measuring electrodes, said insulating pads equally distributed along the circumference of said wall of said borehole for achieving simultaneous measurements.

28. An apparatus for, generating logs and images by measuring inhomogeneities on a wall of formation pierced by a borehole comprising:
   (a) surface equipment including a current inducing generator for creating an electric field, measuring units for determining the local inhomogeneities, and recorders for recording logs and images of the local inhomogeneities;
   (b) a well logging cable connecting said surface equipment to a downhole tool;
   (c) a downhole tool lowered in drilling mud in said borehole including ring-shaped current electrodes connected to said current electrodes connected to said current inducing generator for feeding conductive electrical currents into the rocks, measuring electrodes within said ring-shaped current electrodes, for measuring voltage difference and absolute voltage, connected to amplifier-signal processing-coupling units creating ratios from the said measured voltage difference and the said absolute voltage and transmitting said ratios through the cable for the surface equipment, wherein the said ring-shaped conductive current electrodes are arranged on insulating pads supported on said wall of said borehole by spring-activated arms, whereby they are insulated from said drilling mud, said conductive current feeding the electrodes being capable of feeding currents which flow first parallel to said wall of said borehole then connected to the parallel current lines in series, they flow perpendicular to the wall wherein a voltage difference created by the parallel current lines is measured between a ring-shaped and a central point-shaped measuring electrode both arranged inside the ring-shaped current electrode, and an absolute voltage created by the perpendicular current lines is measured on said central measuring electrode related to a spatially distant reference electrode.

29. The apparatus as set forth in claim 28, wherein amplifying, signal processing, coupling units and microprocessor means for frequency- and phase-selective coupling, signal processing, signal coding and multiplexing for reducing the noise-sensitivity and for measuring simultaneously the different field-generating frequencies is included.

30. The apparatus as set forth in claim 28, wherein said conductive current generating electrodes, and said conductive measuring electrodes are made of metal.

31. The apparatus as set forth in claim 28, characterized by comprising at least two and at most eight insulating pads containing current generating and measuring electrodes, said insulating pads equally distributed along the circumference of said wall of said borehole for achieving simultaneous measurements.

* * * * *